A. E. ARONS.
TRACKLESS POWER DRIVEN VEHICLE.
APPLICATION FILED FEB. 11, 1920.
1,392,904.
Patented Oct. 11, 1921.
2 SHEETS—SHEET 1.
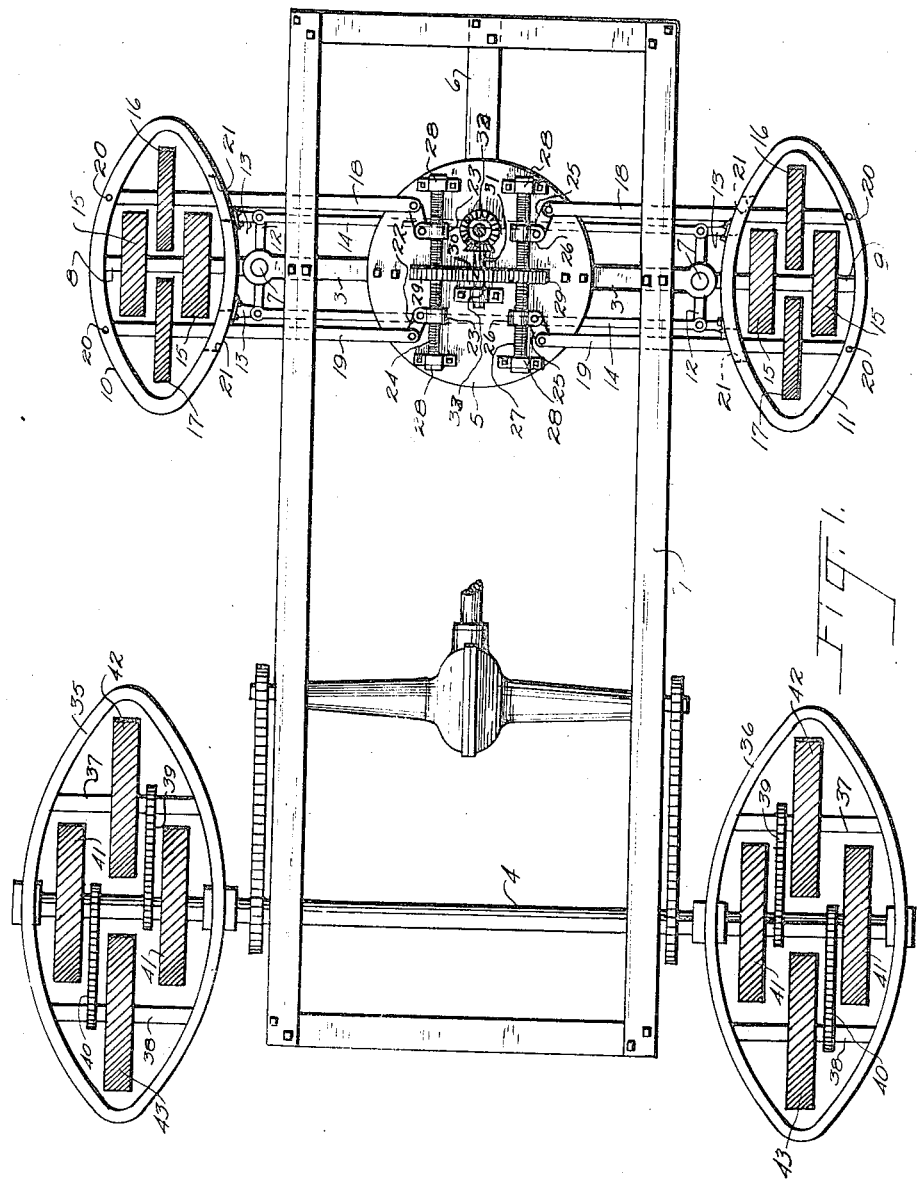

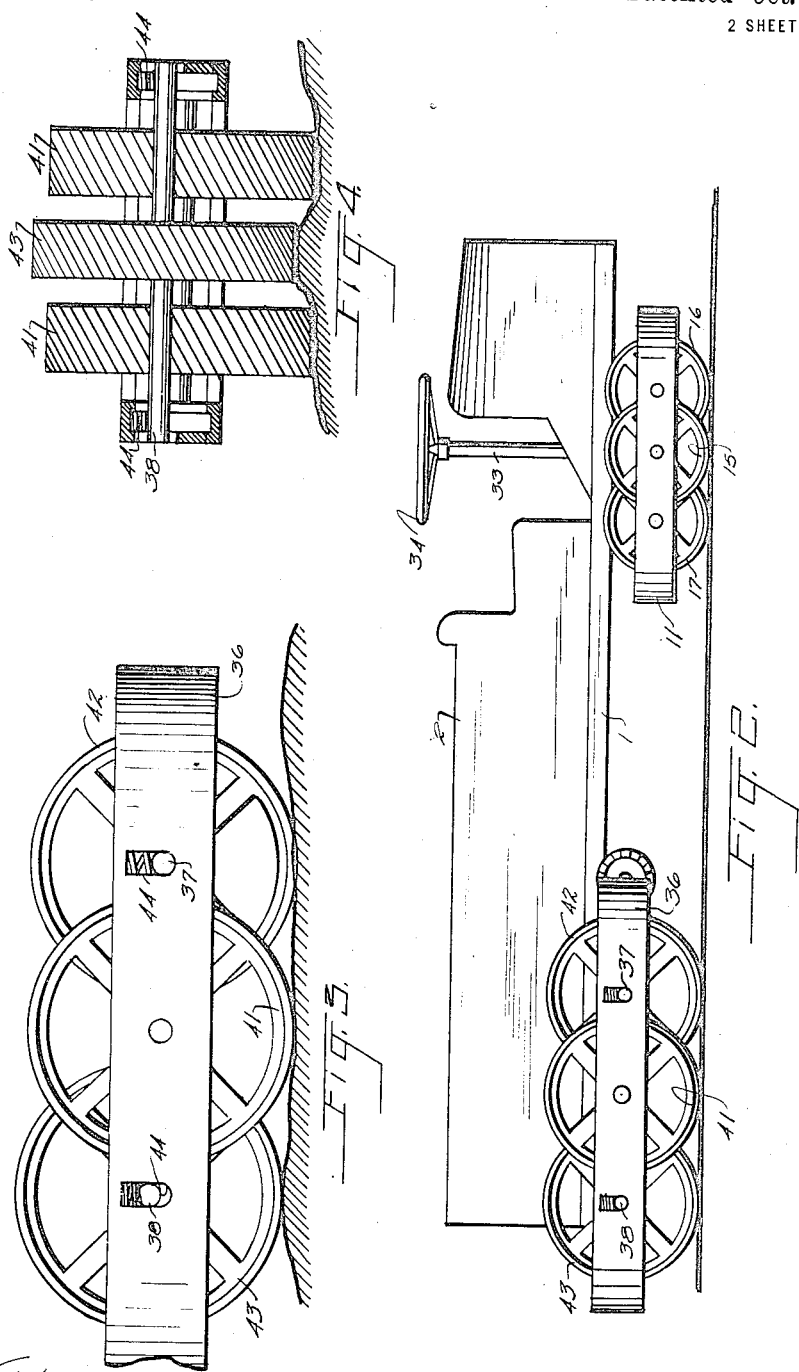

UNITED STATES PATENT OFFICE.

AXEL EMIL ARONS, OF PEORIA, ILLINOIS.

TRACKLESS POWER-DRIVEN VEHICLE.

1,392,904. Specification of Letters Patent. Patented Oct. 11, 1921.

Application filed February 11, 1920. Serial No. 357,967.

*To all whom it may concern:*

Be it known that I, AXEL EMIL ARONS, a citizen of the United States, residing at Peoria, in the county of Peoria and State of Illinois, have invented certain new and useful Improvements in Trackless Power-Driven Vehicles, of which the following is a specification.

This invention relates to improvements in trackless power-driven vehicles and its prime object is to provide a vehicle having the maximum tractive power combined with ease of vehicle operation. General efficiency and durability are other objects sought. A further object is to provide a vehicle that can be safely operated over any and all roads adapted for vehicle travel. With the foregoing and other objects in view the invention consists in the combination and arrangement of parts to be hereinafter fully described, pointed out in the appended claims and illustrated in the accompanying drawings which form a part of this specification and in which—

Figure 1 is a plan view of a vehicle constructed according to my present invention but with the vehicle body omitted.

Fig. 2 is a view of the vehicle in side elevation.

Fig. 3 is an enlarged fragmentary view illustrating the wheel arrangement employed.

Fig. 4 is an end view of Fig. 3.

Like reference characters denote corresponding parts throughout the several views.

My vehicle comprises the frame 1 provided with the usual body 2 which body is supported upon the front cross bar 3 and the rear axle 4. The front cross bar 3 is bolted to the frame 1 and to the table 5 which is further connected to the frame 1 by the bar 6. The free outer ends of the cross bar 3 are connected by pivot bolts 7 to the front axles 8, 9 which axles extend through the front wheel-frames 10, 11 which members are preferably of oval formation and arranged upon opposite sides of the frame 1. A cross rod 12 is also removably arranged upon each pivot bolt 7, said cross rods having bent ends 13 which are bolted to the wheel-frames 10, 11. The cross rods 12 are connected to each other by the parallel transversely extending equalizing bars 14 which serve to maintain the wheel-frames in parallelism. The front axles 8, 9 are each provided with the spaced wheels 15 which run loose upon said axles and between each pair of the wheels 15 a pair of spaced alined wheels 16, 17 are arranged upon the auxiliary front axles 18, 19. The axles 18, two in number, are arranged opposite each other upon opposite sides of the frame and the same is true of the axles 19 and each of said axles is connected by a pivot 20 to one of the sides of one of the wheel-frames, said axles extending through elongated slots 21 formed in said wheel-frames. The axles 18, 19 at one side of the frame 1 are connected by links 22 to the collars 23 which are spaced apart and arranged upon the worm shaft 24 and the axles 18, 19 upon the opposite side of the frame are connected by links 25 to collars 26 spaced apart upon the worm shaft 27, said worm shafts 24, 27 being journaled in bearings 28 secured to the table 5. Each worm shaft has, arranged fast thereupon, a pinion 29 in mesh with a pinion 30 that is fast upon the stub shaft 31 that is connected by bevel gears 32 to the steering shaft 33 controlled by the steering wheel 34. The wheels 16, 17 are loose upon their respective axles to permit a relatively independent movement of the said wheels when the vehicle is turned. The vehicle is turned to the right or left by means of the steering wheel in the ordinary manner, the collars 26 moving upon their worm shaft in a direction opposite to that of the collars 23 upon their shaft.

Referring now to the rear axle 4 which is driven in the usual manner, it is supported in bearings carried by the enlarged rear wheel-frames 35, 36 in which the rotary auxiliary rear axles 37, 38 are journaled, said axles being driven respectively by chain and sprocket wheels 39, 40 from the axle 4. Fast upon the rear axle in each wheel-frame are the spaced traction wheels 41; fast upon each axle 37 is a traction wheel 42 and in alinement therewith upon the axles 38 are the traction wheels 43. The wheel-frames 35, 36 are formed hollow as shown in Fig. 4 and with the elongated slots 44 in which slots the ends of the axles 37 and 38 are disposed beneath stout springs 45. The wheel arrangement is such as to afford the maximum traction over all roads.

What is claimed is:—

1. In a trackless power-driven vehicle, a frame, a cross bar at one end of said frame, wheel-frames, front axles for said wheel-frames pivotally connected to said cross bar, a steering shaft, worm shafts controlled by said steering shaft, auxiliary axles pivoted to said wheel-frames and operatively connected to said worm shafts, wheels for all of said axles, and connection between said wheel-frames whereby they are caused to move in unison.

2. In a trackless power-driven vehicle, a frame, a bar extending transversely of said frame, wheel-frames, front axles for said wheel-frames pivotally connected to said cross bar, spaced wheels arranged upon each front axle, a steering shaft, worm shafts controlled by said steering shaft, auxiliary axles arranged upon opposite sides of said front axles and pivoted to said wheel-frames and operatively connected to said worm shafts, wheels arranged upon said auxiliary shafts between the wheels of said front axles, and connection between said wheel-frames whereby they are caused to move in unison.

In testimony that I claim the foregoing as my own I have hereto affixed my signature in the presence of two subscribing witnesses.

AXEL EMIL ARONS.

Witnesses:
SAM OSTRINSKY,
ALBERT SCUDDER.